United States Patent
Iizuka

(10) Patent No.: US 8,560,894 B2
(45) Date of Patent: Oct. 15, 2013

(54) APPARATUS AND METHOD FOR STATUS DECISION

(75) Inventor: Fumiyuki Iizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 13/007,141

(22) Filed: Jan. 14, 2011

(65) Prior Publication Data

US 2011/0185235 A1    Jul. 28, 2011

(30) Foreign Application Priority Data

Jan. 26, 2010 (JP) ................................. 2010-014720

(51) Int. Cl.
*G06F 11/00* (2006.01)
(52) U.S. Cl.
USPC ........................................ 714/47.3; 714/47.2
(58) Field of Classification Search
USPC ....................................... 714/47.1, 47.2, 47.3
See application file for complete search history.

(56) References Cited

U.S. PATENT DOCUMENTS

| | | | |
|---|---|---|---|
| 7,409,316 B1 * | 8/2008 | Saghier et al. | 702/182 |
| RE43,154 E * | 1/2012 | Gross et al. | 714/39 |
| 8,347,148 B1 * | 1/2013 | Harrison et al. | 714/47.1 |
| 8,472,444 B2 * | 6/2013 | Dighe et al. | 370/392 |
| 8,479,057 B2 * | 7/2013 | Poletto et al. | 714/47.3 |
| 2007/0083513 A1 * | 4/2007 | Cohen et al. | 707/6 |
| 2007/0100875 A1 * | 5/2007 | Chi et al. | 707/102 |
| 2007/0271219 A1 * | 11/2007 | Agarwal et al. | 707/2 |
| 2008/0235365 A1 * | 9/2008 | Bansal et al. | 709/224 |
| 2009/0031176 A1 * | 1/2009 | Ide et al. | 714/47 |
| 2011/0098973 A1 * | 4/2011 | Seidman | 702/179 |
| 2011/0276836 A1 * | 11/2011 | Kahana et al. | 714/38.1 |
| 2013/0189977 A1 * | 7/2013 | Brisebois et al. | 455/434 |

FOREIGN PATENT DOCUMENTS

JP    2006-238043 A    9/2006

* cited by examiner

*Primary Examiner* — Marc Duncan
(74) *Attorney, Agent, or Firm* — Fujitsu Patent Center

(57) ABSTRACT

An abnormality detection apparatus includes: a performance information obtaining unit to obtain load information of a computer; a response time obtaining unit to obtain a response time of the computer; a first abnormality determination unit to determine whether the computer is in abnormal operation state based on the load information; a second abnormality determination unit to determine whether the computer is in abnormal operation state based on the response time, when the first abnormality determination unit determines that the computer is in abnormal operation state; and an abnormality notification unit to perform notification of an abnormality, when the second abnormality determination unit determines that the computer is in abnormal operation state.

12 Claims, 16 Drawing Sheets

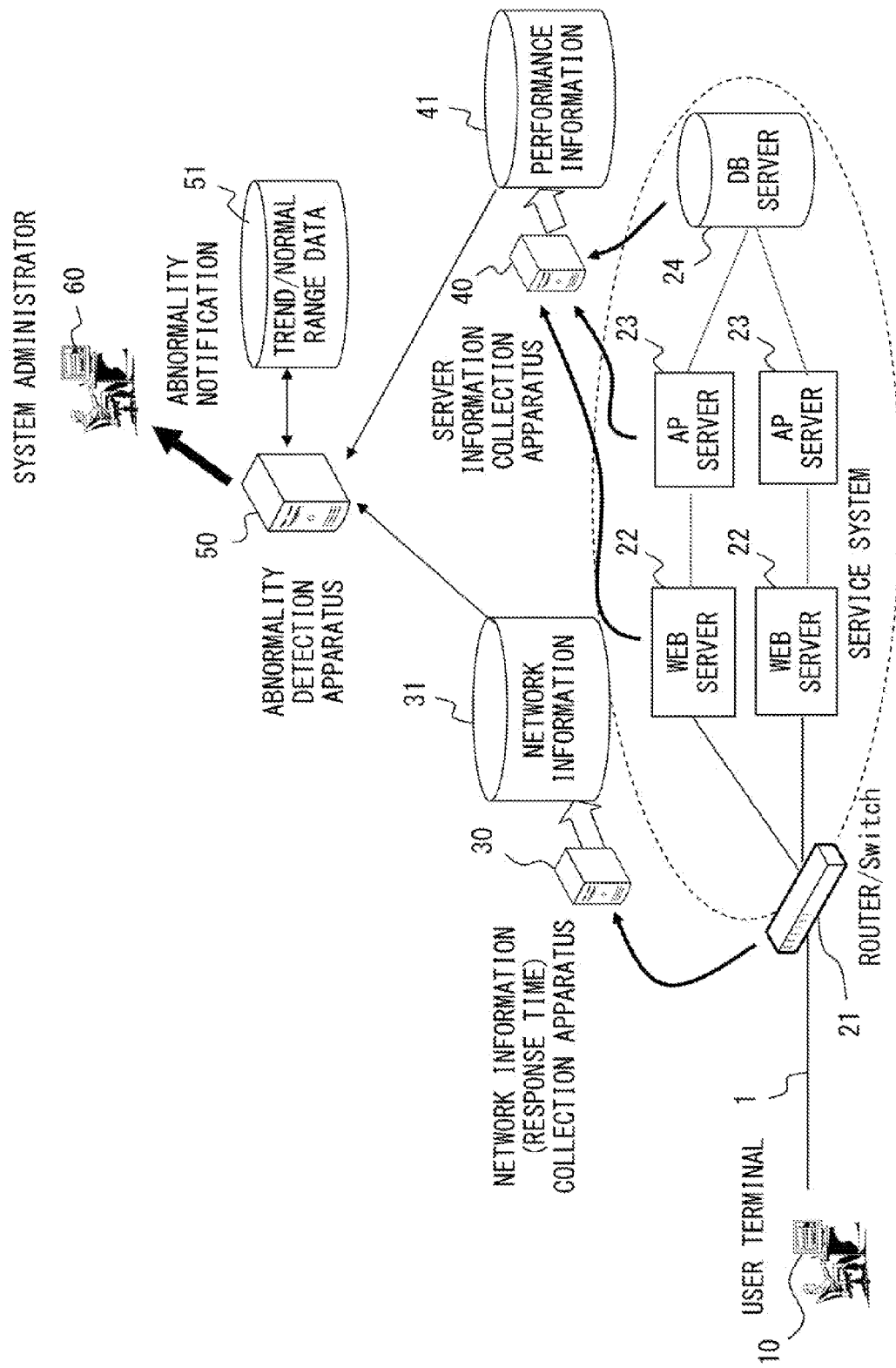
F I G. 1

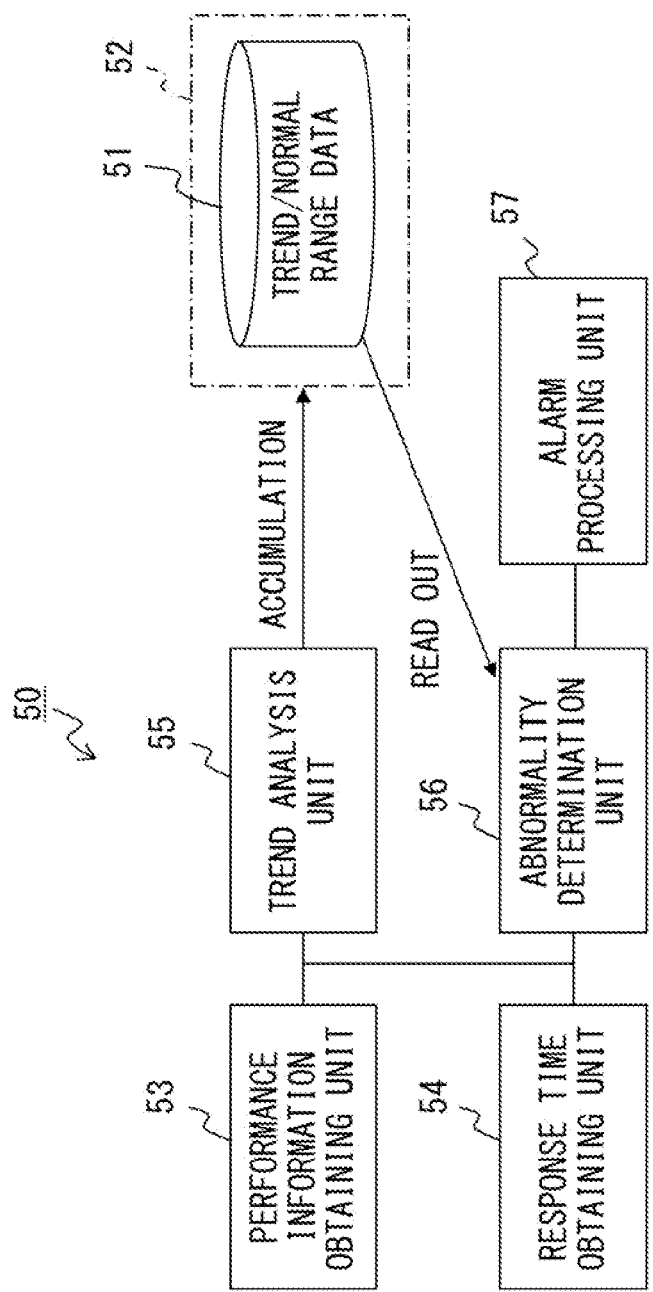
F I G. 2

| TIME AND DATE | SERVER NAME | INPUT PACKET NUMBER | CPU LOAD[%] |
|---|---|---|---|
| 2009/3/30 10:00:00 | WEB01 | 1156 | 5.0 |
| 2009/3/30 10:00:00 | WEB02 | 1203 | 5.4 |
| 2009/3/30 10:00:00 | AP01 | 1023 | 10.1 |
| 2009/3/30 10:00:00 | AP02 | 698 | 8.0 |
| 2009/3/30 10:00:00 | DB01 | 1206 | 10.5 |
| 2009/3/30 10:01:00 | WEB01 | 1256 | 5.8 |
| 2009/3/30 10:01:00 | WEB02 | 1403 | 6.2 |
| 2009/3/30 10:01:00 | AP01 | 1050 | 10.6 |
| 2009/3/30 10:01:00 | AP02 | 878 | 9.1 |
| 2009/3/30 10:01:00 | DB01 | 1506 | 12.5 |
| ... | | | |

FIG. 3

| TIME AND DATE | RESPONSE TIME[ms] |
|---|---|
| 2009/3/30 10:00:00 | 56 |
| 2009/3/30 10:01:00 | 64 |
| 2009/3/30 10:02:00 | 108 |
| ... | |

F I G. 4

| SERVER NAME | TREND GENERATION TIME AND DATE | START DATA | END DATA | REGRESSION LINE | | | NORMAL RANGE UPPER LIMIT | | | NORMAL RANGE LOWER LIMIT | |
|---|---|---|---|---|---|---|---|---|---|---|---|
| | | | | CORRELATION COEFFICIENT | GRADIENT | Y-INTERCEPT | GRADIENT | Y-INTERCEPT | GRADIENT | Y-INTERCEPT | |
| WEB01 | 2009/3/30 10:00 | 2009/3/29 10:00 | 2009/3/30 9:59 | 0.98 | 0.68 | 0.21 | 0.81 | 0.25 | 0.54 | 0.16 |
| AP01 | ... | | | | | | | | | |

F I G. 5

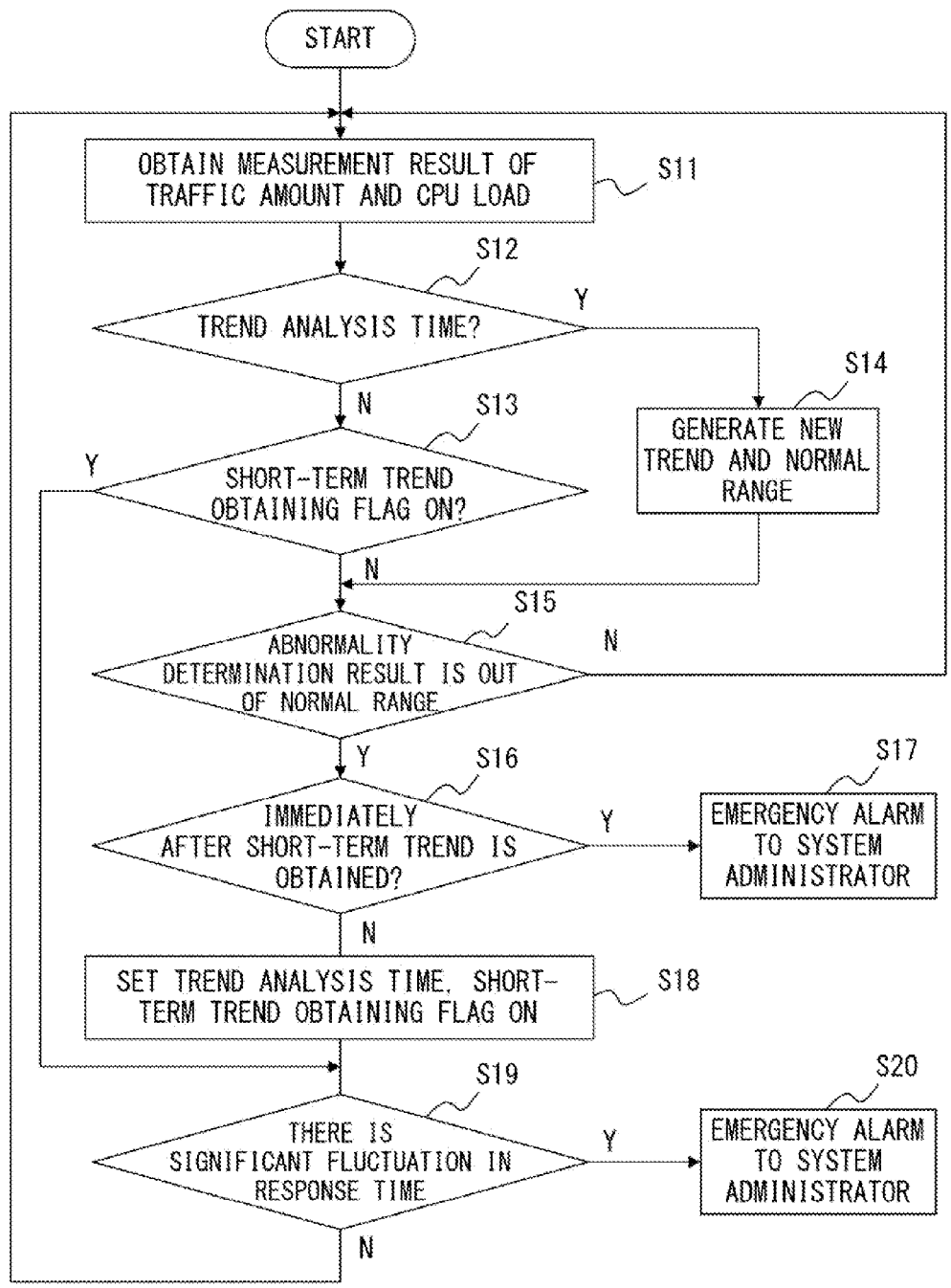
F I G. 1 2

| SERVER NAME | TREND GENERATION TIME AND DATE | START DATA | END DATA | REGRESSION LINE | | | NORMAL RANGE UPPER LIMIT | | NORMAL RANGE LOWER LIMIT | |
|---|---|---|---|---|---|---|---|---|---|---|
| | | | | CORRELATION COEFFICIENT | GRADIENT | Y-INTERCEPT | GRADIENT | Y-INTERCEPT | GRADIENT | Y-INTERCEPT |
| WEB01 | 2009/3/30 10:00 | 2009/3/29 10:00 | 2009/3/30 9:59 | 0.98 | 0.68 | 0.21 | 0.81 | 0.25 | 0.54 | 0.16 |
| AP01 | ... | | | | | | | | | |

| THRESHOLD FOR IMMEDIATE ABNORMALITY NOTIFICATION UPPER LIMIT | | THRESHOLD FOR IMMEDIATE ABNORMALITY NOTIFICATION LOWER LIMIT | |
|---|---|---|---|
| GRADIENT | Y-INTERCEPT | GRADIENT | Y-INTERCEPT |
| 1.02 | 0.32 | 0.34 | 0.1 |

FIG. 14

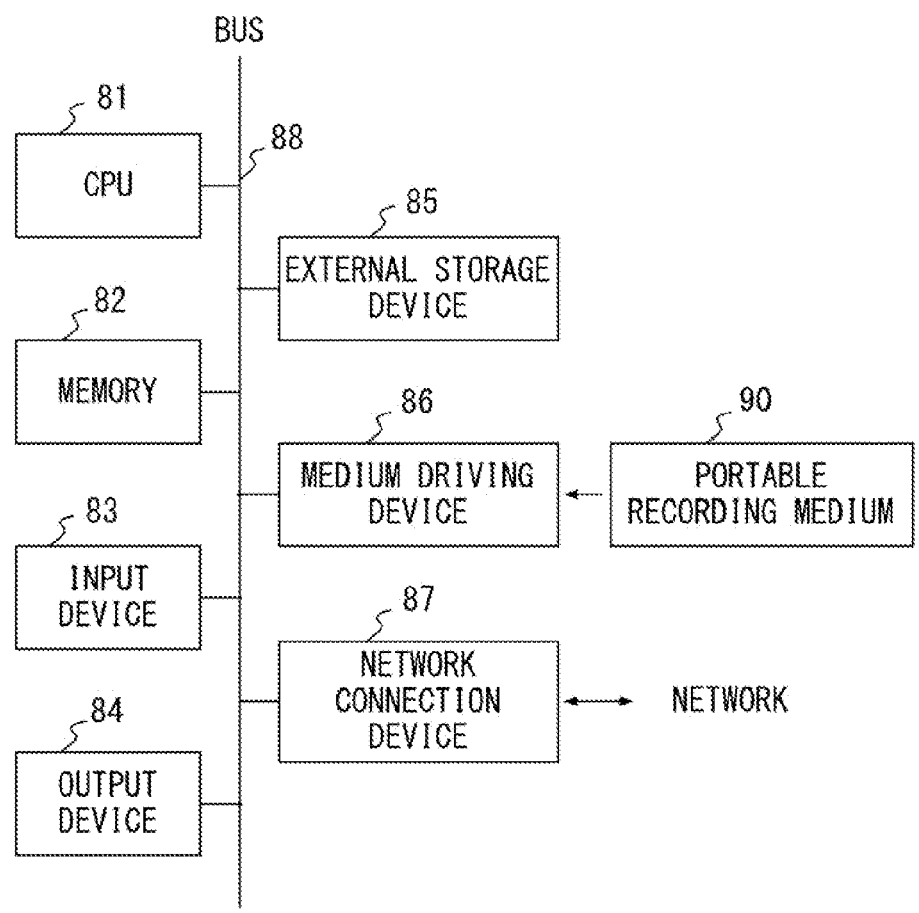
F I G. 16

APPARATUS AND METHOD FOR STATUS DECISION

CROSS-REFERENCE TO RELATED APPLICATIONS

This application is based upon and claims the benefit of priority of the prior Japanese Patent Application No. 2010-014720, filed on Jan. 26, 2010, the entire contents of which are incorporated herein by reference.

FIELD

The present invention relates to a technique for detecting an abnormality occurring in a service system that provides services to a user of a terminal device connected via a communication network.

BACKGROUND

Conventionally, methods have been proposed for determining an abnormality early by obtaining traffic statistics information from a relay apparatus and performing a time-series analysis to predict the number of future relay communication (for example, Japanese Laid-open Patent Publication No. 2006-238043).

SUMMARY

According to an aspect of the invention, an abnormality detection apparatus includes: a performance information obtaining unit to obtain load information of a computer; a response time obtaining unit to obtain a response time of the computer; a first abnormality determination unit to determine whether the computer is in abnormal operation state based on the load information; a second abnormality determination unit to determine whether the computer is in abnormal operation state based on the response time, when the first abnormality determination unit determines that the computer is in abnormal operation state; and an abnormality notification unit to perform notification of an abnormality, when the second abnormality determination unit determines that the computer is in abnormal operation state.

According to another aspect of the invention, an abnormality detection method performed by a processor includes: obtaining load information of a target computer; obtaining a response time of the target computer; determining whether the target computer is in abnormal operation state based on the load information; determining whether the target computer is in abnormal operation state based on the response time, when it is determined based on the load information that the target computer is in abnormal operation state; and performing notification of an abnormality when it is determined based on the response time that the target computer is in abnormal operation state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating the configuration of a network system in which an abnormality detection apparatus according to an embodiment is adopted.

FIG. 2 is a diagram illustrating functions of an abnormality detection apparatus according to the embodiment.

FIG. 3 is a diagram illustrating performance information collected by a server information collection apparatus.

FIG. 4 is a diagram illustrating network information collected by a network information collection apparatus.

FIG. 5 is a diagram illustrating trend/normal range data.

FIG. 12 is a flowchart of an abnormality detection process.

FIG. 14 is a diagram illustrating trend/normal range data in a case of setting a threshold value for an immediate abnormality notification.

FIG. 16 is a diagram illustrating an example of the hardware configuration of a computer to which the present invention may be applied.

DESCRIPTION OF EMBODIMENTS

Figure 6:
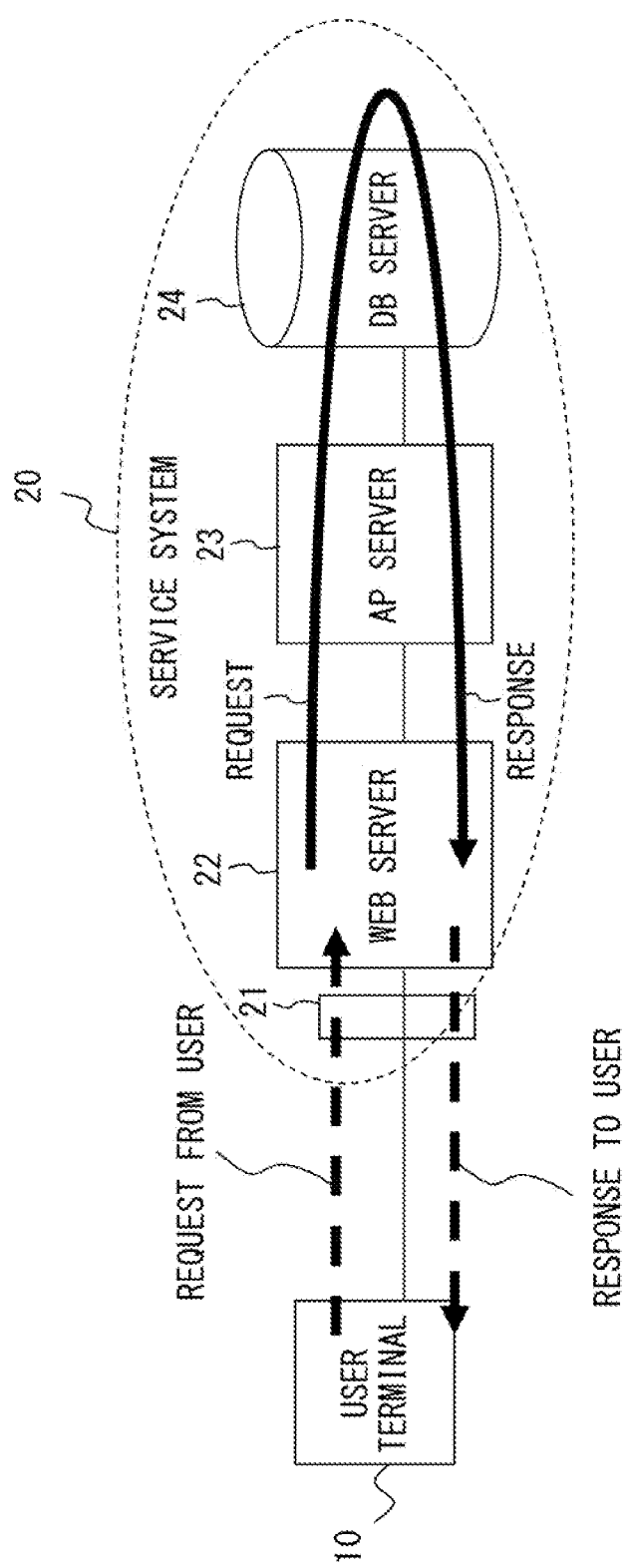
FIG. 6 is a diagram illustrating the response time of a service system.

With recent development of communication networks, a number of service systems have been established that provides services to users of terminal devices connected to the communication networks. The service system is established using one or more servers (data processing apparatuses). Service systems used by a large number of people or providing a large variety of services are established with a plurality of servers (data processing apparatuses), to balance the load. For this reason, many of such service systems are large in scale.

It is important to render a service comfortable for use. Accordingly, in order to maintain the quality of service constantly, information indicating the operation status of a server (computer) has been collected as performance information (load information) and monitored. Examples of the performance information include the CPU load (utilization), the memory utilization, the disk utilization, and the data amount (traffic amount) input (received) per unit time. Usually, the amount of data requiring the provision of the service does not fluctuate according to the type and the status of the service. Therefore, the traffic amount represents the number of requests with which the service is required.

For a large-scale service system, it is difficult to create a model of its load since it is capable of providing a large variety of services or a large number of people use it. However, there exists a correlation between the number of requests from users and processing amount (load) of the servers of the service system. Accordingly, in a service system, for each service within the service system, correlation analysis of the traffic amount (number of requests) of the server and the CPU load of the server is often performed, to perform abnormality determination using the result.

In this monitoring method, the result of the correlation analysis, that is, the correlation between the traffic amount and the CPU load is adopted as a trend (tendency), and from the trend, a normal range of combinations of the traffic amount and the CPU load that are regarded as normal is generated (set). Accordingly, in this monitoring method, when an obtained combination of the traffic amount and the CPU load is not within the normal range, it is determined as an occurrence of an abnormality. The abnormality detection apparatus determines whether or not an abnormality has occurred in such a way. The combination of the traffic amount and the CPU load used for the correlation analysis is taken from performance information obtained within a recent specified period. The combination of the traffic amount and the CPU load compared with the normal range is also obtained from the performance information.

In a service system, the system administrator may perform an alteration such as addition or modification of a service. The trend obtained from the correlation analysis may change according to such an alteration. Thus the normal range is, for example, re-generated at a specified timing. However, any trend in line with the alteration has not been generated immediately after such an alteration is made. For this reason, if the trend changes to a relatively large extent according to the alteration, an erroneous determination of an occurrence of an abnormality may occur even if no actual abnormality is occurring.

Since there is the possibility that such an erroneous determination may be made, there are some system monitoring methods that are configured not to make determination of an occurrence of an abnormality for a certain period, when a combination of the traffic amount and the CPU load goes out of the normal range. In such system monitoring methods, after a new normal range is obtained by a new correlation analysis, abnormality determination is performed using the new normal range. According to the method, an abnormality is correctly detected.

An alteration by the system administrator is not the only cause that drives an obtained combination of the traffic amount and the CPU load out of the normal range. In other words, an actually-occurred abnormality, that is, an abnormality that requires notification may be the cause. For this reason, in the monitoring method that does not determine abnormality for a specified period after detection of an abnormality, if a serious abnormality that requires immediate notification has actually occurred, notification of the abnormality to the system administrator may be delayed. This delay makes more people unable to use the service comfortably and prolongs the period in which the service is not used comfortably.

A possible measure to cope with changes of the normal range according to an instruction by the system administrator is, a method in which the system administrator instructs the resetting of the normal range. However, even with this method, determination of an abnormality is not performed until the normal range is reset.

The system administrator often performs service alteration operations such as addition/modification/deletion of a service and system alternation operations such as tuning. However, to issue an instruction for resetting the normal range increases burden on the system administrator. For these reasons, it is important to enable the system administrator to immediately notice an actually-occurred serious abnormality while suppressing increases in the burden the system administrator in addition to responding to trend change caused by instruction from the system administrator.

Hereinafter, embodiments of the present invention are explained with reference to the drawings.

FIG. 1 illustrates the configuration of a network system in which an abnormality detection apparatus according to an embodiment is adopted.

The network system has, as illustrated in FIG. 1, a service system 20, a network information collection apparatus 30, a server information collection apparatus 40, an abnormality detection apparatus 50, and a terminal apparatus 60. The service system 20 is connected to a communication network 1 to which the terminal apparatus 10 may be connected. In addition, the service system 20 is capable of providing services to the user of the terminal apparatus 10. The network information collection apparatus 30 collects network information 31 regarding data (packets) transmitted and received by the service system 20 via the communication network 1. The server information collection apparatus 40 collects, for each server in the service system 20, performance information 41 indicating the operation status of the server. The abnormality detection apparatus 50 detects an abnormality (abnormal operation state) that has occurred in the service system 20 using information collected respectively by the network information collection apparatus 30 and the server information collection apparatus 40. The terminal apparatus 60 is used by the system administrator. The abnormality detection apparatus 50 is an example of the abnormality detection apparatus according to the embodiment.

The service system 20 described above has a router 21, a plurality of WEB servers 22, a plurality of application (AP) servers 23, and one or more database (DB) servers 24. The router 21 and each of the servers (detection-target computer) 22-24 are connected to a LAN, for example.

The router 21 refers to the destination address stored in the header of a packet received from the terminal apparatus 10, and transfers the packet to a corresponding one of the WEB servers 22. The WEB server 22 analyzes the received packet, and requests the AP server 23 to execute a process for providing the service requested by the packet. The AP server 23 obtains data from the DB server 24 as needed, executes the requested process, and returns the result of the execution to the WEB server 22. The WEB server 22 generates and transmits a packet as a response using the result of the execution. The packet transmitted in this way is received by the terminal apparatus 10 through the router 21 and the communication network 1. Hereinafter, the terminal apparatus 10 is referred to as a "user terminal" in order to distinguish it from the terminal apparatus 60 used by the system administrator.

FIG. 6 illustrates the response time of the service system 20. In FIG. 6, a packet transmitted from the user terminal 10 is received by the router 21 of the service system 20 and transferred to the WEB server 22 to be processed. As a result, as described above, the process by the AP server 23, the process by the DB server 24, the process by the AP server 23, and the process by the WEB server 22 are executed respectively, and a packet generated by the WEB server 22 is output to the communication network 1 through the router 21. Accordingly, the response time of the service system 20 as a whole that is the time required from the reception of the packet from the user terminal 10 to the return of the packet as a response is obtained by total time period for execution of the processes by the respective servers 22-24, the time required for the communication between the servers, and so on.

The router 21 is equipped with a time measuring program to measure the response time. The time measuring program measures the response time, for example, for each packet received from the user terminal 10, and calculates the average of the measured response times for every specified unit time.

The network information collection apparatus 30 collects the average response time as the network information 31 from the router 21 at intervals of the unit time, for example.

FIG. 4 illustrates the network information 31 collected by the network information collection apparatus 30. As illustrated in FIG. 4, the network information collection apparatus 30 saves the network information 31 by storing the average response time information with time and date information indicating the time and date of the collection of the average value in one record (entry). The time and date information may be added by the router 21, or may be added by the network information collection apparatus 30.

The collection of response time information (or average response time information) are performed using a known art. Hereinafter, unless particularly stated otherwise, the term "response time" is used to indicate the average value of the collected response times.

Each of the servers 22-24 generates, for example, according to specified setting, performance information (load information) 41 indicating the operation status of the server itself. The information generated as the performance information 41 includes the traffic amount of the relevant server, the CPU load (utilization), and time and date. In this embodiment, the number of input packets is adopted as information indicating the traffic amount. The number of input packets is the total number of packets input during a specified unit time, and the CPU load is the average CPU load during the unit time. The performance information 41 is collected by the server information collection apparatus 40 at intervals of the unit time.

FIG. 3 illustrates an example of the performance information 41 collected by the server information collection apparatus 40. As illustrated in FIG. 3, the server information collection apparatus 40 saves the performance information 41 including the time and date, the number of input packets and the CPU load by storing the performance information 41 with addition of the server name being an identifier indicating the server that collected the performance information 41, in one record (entry). Such collection of the performance information 41 is performed also using a known art.

For example, in the similar manner as the server information collection apparatus 40, the abnormality detection apparatus 50 obtains newly collected performance information 41 from the server information collection apparatus 40 at intervals of the unit time. Correlation analysis between the traffic amount (the number of input packets) and the CPU load is performed for each server at specified time intervals, for example. From the correlation analysis, a regression line indicating the correlation between the number of input packets and the CPU load is generated as a trend (tendency) for example, and from the trend, a normal range of combinations of the number of input packets and the CPU load that are regarded as normal is generated. The abnormality detection apparatus 50 performs abnormality determination according to whether the combination of the number of input packets and the CPU load indicated by the performance information 41 obtained from the server information collection apparatus 40 as needed is within the normal range.

Figure 7:
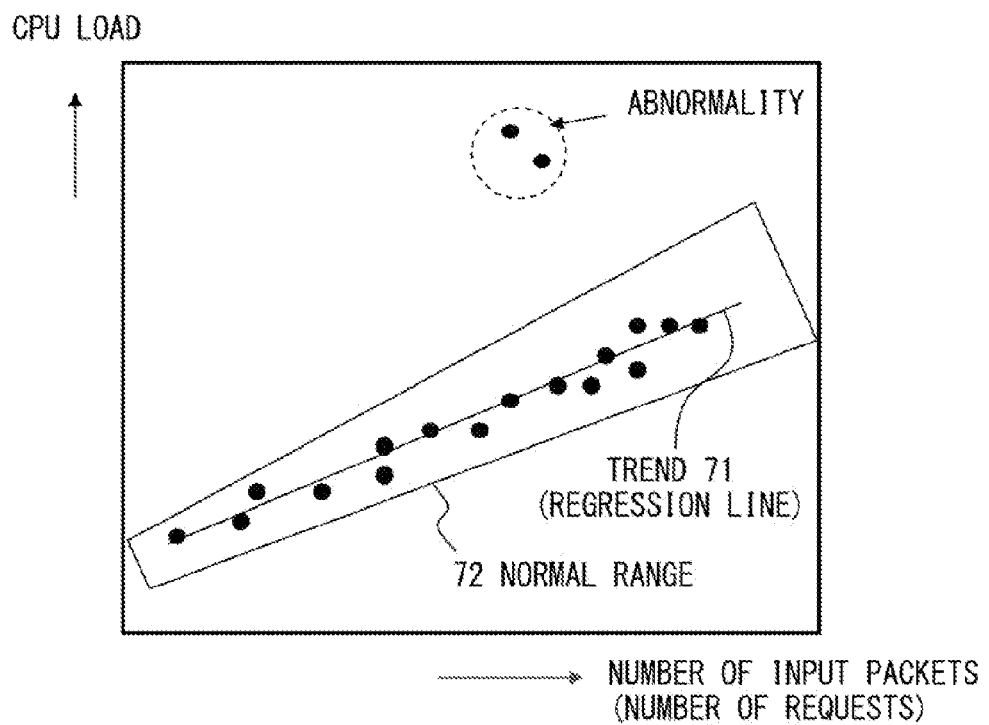
FIG. 7 is a diagram illustrating the abnormality determination performed using the normal range.

FIG. 7 illustrates abnormality determination performed using the normal range. In FIG. 7, the horizontal (X) axis represents the number of input packets, and the vertical (Y) axis represents the CPU load. In addition, in FIG. 7, a trend 71 and a normal range 72 of one server are expressed on the XY plane (the expression is made in the same way in FIG. 8, FIG. 11 and FIG. 13). The normal range 72 is expressed in a quadrangle. The upper limit and the lower limit of the normal range 72 are generated in a way in which, as the number of input packets increases, the absolute value of the difference from the trend 71 becomes larger. The reason for generating the lower limit is because there are some cases in which the CPU load decreases significantly due to reasons such as that a server cannot execute a process that the server is supposed to execute.

A black circle in FIG. 7 represents a combination of the number of input packets and the CPU load, that is, observation data actually observed in the form of the performance information 41. Accordingly, FIG. 7 illustrates that when observation data positioned outside the normal range 72 is obtained, the observed status is determined as abnormal. In other words, the abnormality detection apparatus 50 determines that the service system 20 is in abnormal operation state, if the observed data is detected outside the normal range 72. However, the abnormality detection apparatus 50 does not perform notification of an abnormality at this time.

The abnormality detection apparatus 50 manages the generated trend 71 and the normal range 72 as trend/normal range data 51. FIG. 5 illustrates an example of the trend/normal range data 51. As illustrated in FIG. 5, the trend/normal range data 51 includes the server name indicating the corresponding server, the time and date of the generation of the trend 71 (trend generation time and date), start data indicating the time and date on which the trend/normal range data 51 is set to be valid, end data indicating the time and date on which the trend/normal range data 51 is set to be invalid, regression line data indicating the trend 71, normal range upper limit data indicating the upper limit of the normal range 72, and normal range lower limit data indicating the lower limit of the normal range 72. The regression line data includes the correlation coefficient, gradient and Y-intercept. The normal range upper limit data and the normal range lower limit data include the gradient and Y-intercept.

The abnormality detection apparatus 50 generates the next trend 71 and the next normal range 72 when the time and date indicated by the end data have passed. Alteration made by the system administrator such as addition of a service is performed separately from the generation of the trend 71 and the normal range 72. In addition, appropriate generation of the normal range 72 requires a certain amount of the performance information 41. For these reasons, immediately after the system administrator performs an alteration such as addition of a service, appropriate normal range 72 in line with the alteration may not be generated.

Figure 8:
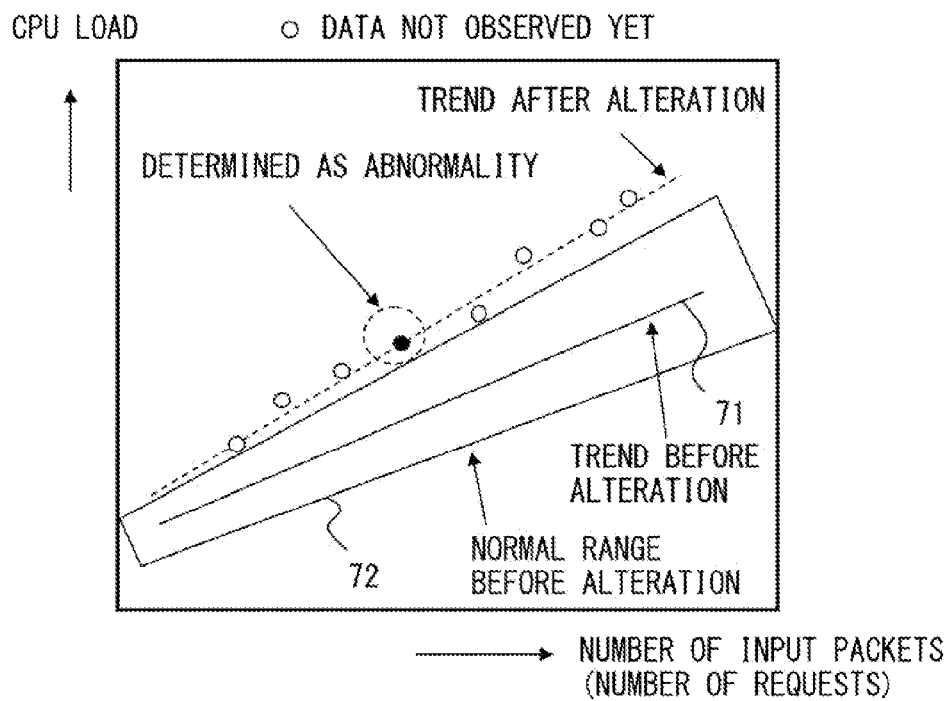
FIG. 8 is a diagram illustrating an example of the combination of the number of input packets and the CPU load obtained from the performance information.

In the service system 20 illustrated in FIG. 1, when a service is added, the CPU load with respect to the number of input packets of at least one of the AP server 23 and the DB server 24 increases. For this reason, as illustrated in FIG. 8, the position of the black circle representing the combination of the number of input packets and the CPU load obtained as the observation data, that is, the performance information 41 may be outside the normal range 72 even if no abnormality has occurred. However, appropriate determination may not necessarily be performed as to whether or not an abnormality is actually occurring only by comparing the observation data and the normal range 72. In other words, for example, when the trend 71 is changed due to operation of the system administrator, status that is not abnormal may be determined as abnormal. For these reasons, in this embodiment, the following measures are taken when the observation data goes out of the normal range 72. Specific explanation is made with reference to FIG. 9-FIG. 11.

Figure 9:
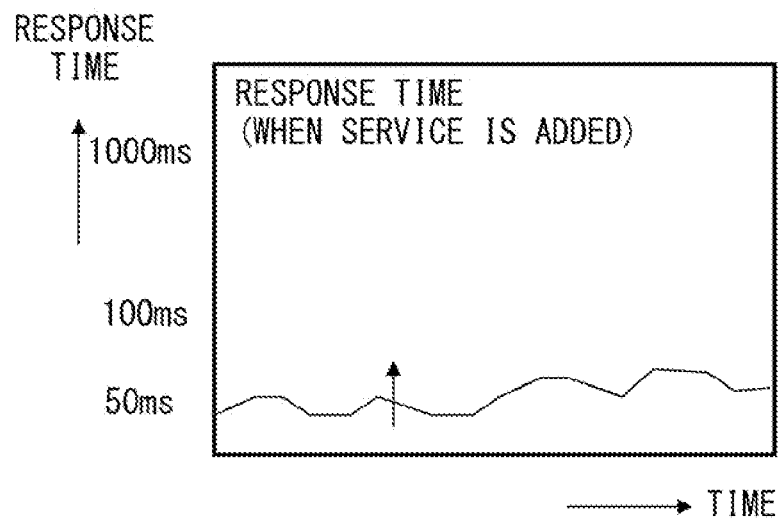
FIG. 9 is a diagram illustrating an example of the response time in a case in which the system administrator added a service.

FIG. 9 illustrates an example of changes in the response time in a case where a service is added. In FIG. 9, the horizontal (X) axis represents the time, and the vertical (Y) axis represents the response time. That is, FIG. 9 illustrates the temporal change in the response time. Meanwhile in FIG. 9, the timing at which a service is added is indicated with an arrow.

As illustrated in FIG. 9, if a service is added in the situation in which no abnormality is occurring, the response time does not change significantly. The reason is possibly that the number of input packets does not often change significantly before and after addition of a service, and that addition of a service that would change the CPU load significantly is not performed very often.

If the response time does not change significantly, the user does not feel the quality of the service that the user is using has deteriorated. For this reason, even if the observation data goes out of the normal range 72, immediate action by the system administrator is not needed. Therefore, notification of the abnormality to the user is not performed immediately.

Figure 10:
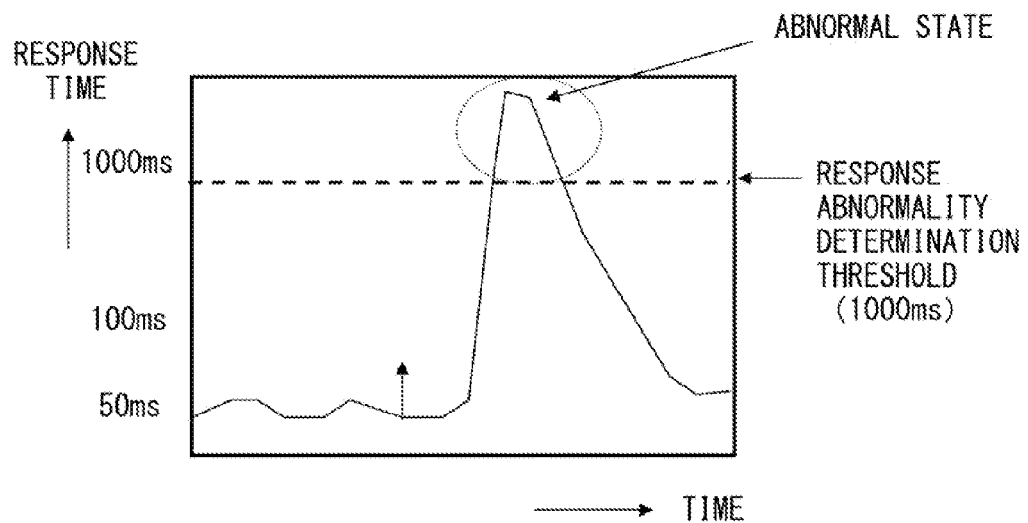
FIG. 10 is a diagram illustrating an example of changes in the response time in a case in which an abnormality occurs.

FIG. 10 illustrates an example of changes of the response time in a case where an abnormality occurs. Here, FIG. 10 illustrates the temporal change in the response time as well as FIG. 9. However, in FIG. 10, the timing at which an abnormality occurs is indicated with an arrow. A change in the response time as illustrated in FIG. 10 occurs, for example, due to an abnormality with which garbage collection to automatically release unnecessary area in the memory secured dynamically by a program occurs frequently within a short period of time.

As illustrated in FIG. 10, when an abnormality occurs, the response time becomes very long. A very long response time is likely to cause the user feel deterioration in the quality of service. For this reason, in this embodiment, a threshold for determining an abnormality that requires immediate notification (response abnormality determination threshold) is set, and when the response time exceeds the threshold, notification of the abnormality is performed immediately to the system administrator. The notification is realized by, for example, by transmitting a message or a mail for reporting the occurrence of the abnormality to the terminal apparatus 60 used by the system administrator.

Thus, in this embodiment, when the observation data is detected outside the normal range 72, the abnormality detection apparatus 50 refers to the response time and determines whether or not it is an abnormality that requires immediate notification. The abnormality detection apparatus 50 performs notification of the abnormality to the system administrator immediately if the abnormality detection apparatus 50 determines the abnormality requires immediate notification. On the other hand, if it is determines the abnormality does not require immediate notification, it is regarded as unlikely to be a serious abnormality and as having little influence on the user using the service, and the abnormality detection apparatus 50 refrains from reporting the abnormality. Therefore, delay in notification of a serious abnormality is avoided. Accordingly, the number of people who does not use the service comfortably and the time during which the service is not be used comfortably is reduced. For performing the abnormality determination as described above, the abnormality detection apparatus 50 obtains the network information (response time) through the network information collection apparatus 30.

Meanwhile, while the response abnormality determination threshold is set as the determination criterion for determining (detecting) an abnormality that requires immediate notification in this embodiment, the variation amount of the response time may be adopted as the determination criterion. The threshold of the variation amount may be a fixed time as well as the response abnormality determination threshold, or may be a ratio that is obtained by, for example, dividing the difference in the response times per unit time by one of the two response times used for calculating the difference. It may also be a ratio that is obtained, in consideration of variation in the number of input packets, by multiplying the variation amount (ratio) obtained by such a calculation by the ratio of the accumulated values of the number of input packets of each WEB server 22 at the times when the two response times were obtained. Both the response abnormality determination threshold and the variation amount threshold may also be used. In that case, a method may be adopted in which even though the variation amount (ratio) is below the threshold, if the response time exceeds the response abnormality determination threshold, it is determined as an abnormality.

Figure 11:
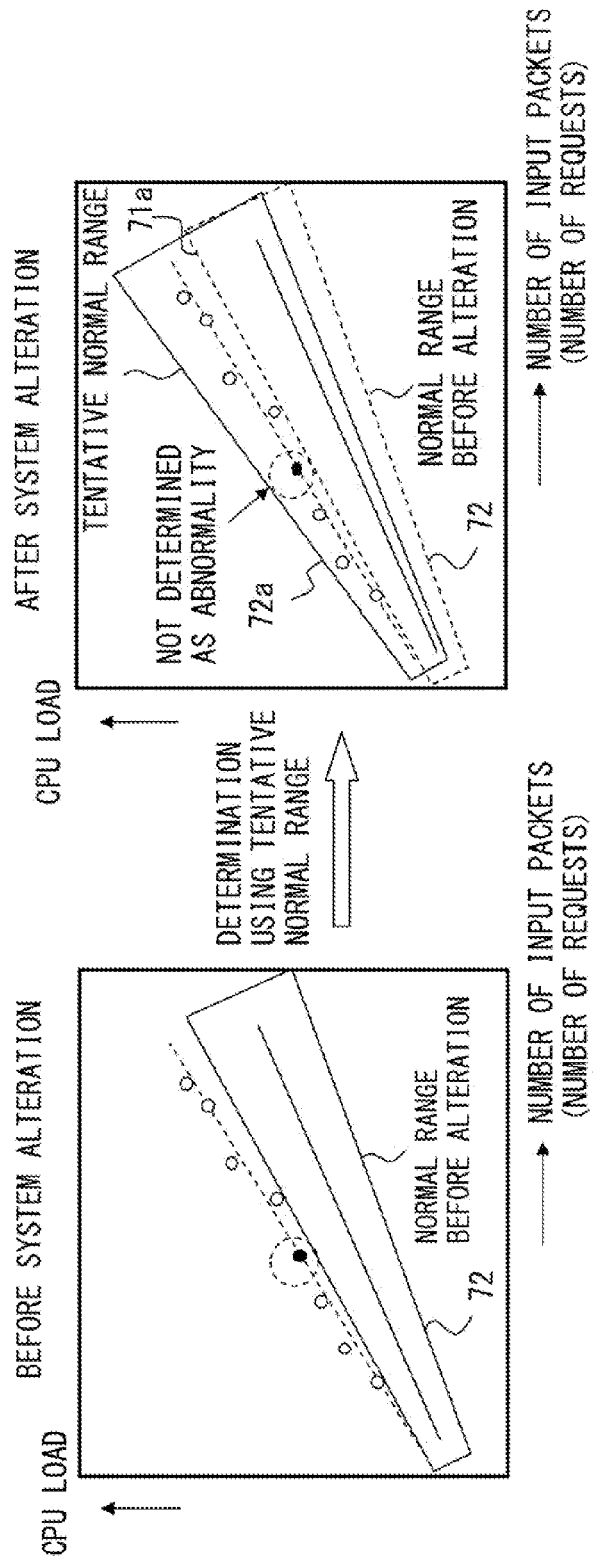
FIG. 11 is a diagram illustrating a method for taking action in a case in which an abnormality is not determined as requiring immediate notification.

When it is determined that the detected abnormality does not require immediate notification, in this embodiment, it is recognized that the abnormal observation data is generated due to an operation by the system administrator, such as addition of a service, then the abnormality detection apparatus 50 changes the trend 71. That is, as illustrated in FIG. 11, the abnormality detection apparatus 50 tentatively generates a trend 71a and a normal range 72a, and checks whether or not newly obtained observation data is within the normal range 72a. When the observation data is out of the normal range 72a, the abnormality detection apparatus 50 determines that an abnormality is occurring and performs notification of the abnormality to the system administrator. On the other hand, when the observation data is within the normal range 72a, the abnormality detection apparatus 50 determines that no abnormality is occurring and does not perform notification of abnormality to the system administrator.

As described above, in the present embodiment, the abnormality detection apparatus 50 performs immediate notification for a serious abnormality that requires immediate notification, and performs notification of other anomalies as needed according to abnormality determination using the newly generated normal range 72a. Accordingly, the system administrator is required to take action only on abnormalities that require an action, and does not need to perform unnecessary operations. This means that the burden on the system administrator is reduced. In addition, deterioration in the quality of service is minimized as a prompt action may be taken for serious anomalies that require immediate action.

FIG. 2 illustrates the functions of the abnormality detection apparatus 50. As illustrated in FIG. 2, the abnormality detection apparatus 50 has a storage unit 52, a performance information obtaining unit 53, a response time obtaining unit 54, a trend analysis unit 55, an abnormality determination unit 56, and an alarm processing unit 57. The storage unit 52 stores various data including a trend/normal range data 51. The performance information obtaining unit 53 obtains the performance information 41 from the server information collection apparatus 40. The response time obtaining unit 54 obtains the network information (response time) 31 from the network information collection apparatus 30. The trend analysis unit 55 generates the trend/normal range data 51 that represents the trend 71 and the normal range 72 from correlation analysis using the performance information 41 obtained by the performance information obtaining unit 53. The abnormality determination unit 56 determines an abnormality using the performance information 41 obtained by the performance information obtaining unit 53, the network information 31 obtained by the response time obtaining unit 54, and the trend/normal range data 51 stored in the storage unit 52. That is, the abnormality determination unit 56 detects an abnormal operation of the service system 20. When the abnormality determination unit 56 detects an abnormality, the alarm processing unit 57 performs notification of the abnormality to the system administrator. The operations of the respective units 53-57 realize the abnormality determination described above.

The functional units illustrated in FIG. 2 is realized by making a computer used as the abnormality detection apparatus 50 execute an abnormality detection program according to the present embodiment. Here, a computer that may be used as the abnormality detection apparatus 50 by executing the abnormality detection program is described with reference to FIG. 16.

The computer illustrated in FIG. 16 is configured to have a CPU 81, a memory 82, an input device 83, an output device 84, an external storage device 85, a media driving device 86, and a network connection device 87 that are connected to each other via a bus 88. The configuration illustrated in FIG. 16 is an example and the configuration is not limited to it.

The CPU 81 performs control of the computer as a whole. The memory 82 is a semiconductor memory such as a RAM that temporarily stores a program or data stored in the external storage device 85 (or a portable recording medium 90) at the time of program execution, data update and so on. The CPU 81 performs the overall control by reading out the program on the memory 82 and executing the program.

The input device 83 is, for example, an interface that may be connected to a manipulation device such as a keyboard, mouse and so on. The input device detects manipulation of the user on the manipulation device and performs notification of the detection result to the CPU 81.

The output device 84 is a display control apparatus connected to a display apparatus, for example. The network connection device 87 enables communication with the network information collection apparatus 30 and the server information collection apparatus 40 via a communication network, for example. The external storage device 85 is a hard disk device for example and may be used for saving various data and programs. The medium driving device 86 accesses the portable recording medium 90 such as an optical disk and a magneto-optical disk.

The abnormality detection program described above is recorded in the external storage apparatus 85 or the recording medium 90, or obtained by the network connection 87 via a communication network. The abnormality detection apparatus 50 is realized by the abnormality detection program being readout on the memory 82 and executed by the CPU 81.

In the configuration illustrated in FIG. 16, the storage unit 52 in FIG. 2 is realized by, for example, the external storage device 85, or the portable recording medium 90. In a case in which the abnormality detection program and various data including the trend/normal range data 51 are stored in the external storage device 85, the performance information obtaining unit 53, the response time obtaining unit 54 and the alarm processing unit 57 are realized by the CPU 81, the memory 82, the external storage device 85, the network connection device 87, and the bus 88, for example. The trend analysis unit 55 and the abnormality determination unit 56 are both realized by the CPU 81, the memory 82, the external storage device 85, and the bus 88, for example.

FIG. 12 is a flowchart of the abnormality detection process. The abnormality detection process is realized by the abnormality detection program being executed by the abnormality detection apparatus 50. By executing the detection process, the abnormality detection apparatus 50 performs abnormality determination as described above. The detection process is explained in detail with reference to FIG. 12.

In step S11, the abnormality detection apparatus 50 obtains the performance information 41 from the server information collection apparatus 40 and the network information 31 from the network information collection apparatus 30, respectively. In step S12, the abnormality detection apparatus 50 determines whether or not the current time and date is later than the time and date indicated by the end data (in FIG. 12, described as "TREND ANALYSIS TIME"). If the current time and date is later than the time and date indicated by end data, the determination is YES, and the abnormality detection apparatus 50 generates the new trend 71 and the normal range 72 in step 14. If the current time and date is earlier than the trend analysis time, the determination becomes NO, and the process moves to step S13.

As described above, if the combination of the number of input packets and the CPU load indicated by obtained performance information 41 is out of the normal range 72, the abnormality detection apparatus 50 regenerates the trend 71 and the normal range 72. The regeneration is performed while turning on a short-term trend obtaining flag being a variable, and setting the end data indicating the time and date on which the regeneration is to be performed. If the combination of the number of input packets and the CPU load is not out of the normal range 72, the determination in step S12 becomes YES as the time and date indicated by the end data of the trend/normal range data 51 that is set as valid passes. Therefore, the time and date indicated by the end data may be updated. Accordingly, in FIG. 12, the time and date indicated by the end data is described as "TREND ANALYSIS TIME". If the short-term trend obtaining flag is ON when step S14 is performed, the abnormality detection apparatus 50 generates the trend/normal range data 51, and turn off the short-term trend obtaining flag. Hereinafter, the trend 71 that is regenerated with the short-term trend obtaining flag being ON is referred to as a "short-term trend 71*a*". Hereinafter, the normal range 72 set from the short-term trend 71*a* is referred to as a "short-term normal range 72*a* ".

In step S13, the abnormality detection apparatus 50 determines whether or not the short-term trend obtaining flag is ON. If the flag is ON, for example, with the value of the flag being 1, the determination is YES, and the process moves to step S19. If the flag is OFF, for example, with the value of the flag being 0, the determination is NO, and the process moves to step 15.

In step S15, for each of the obtained performance information 41, the abnormality detection apparatus 50 compares the combination of the number of input packets and the CPU load with the normal range 72 indicated by the trend/normal range data 51, and determines whether or not the combination is out of the normal range 72. If any of the combinations is out of the normal range 72, the determination is YES, and the process moves to step S16. If all of the combinations are within the normal range 72, the determination is NO, and the process returns to step S11 described above.

In step S16, the abnormality detection apparatus 50 determines whether or not it is immediately after a short-term trend is generated (obtained). If the combination of the number of input packets and the CPU load is confirmed as out of the new short-term normal range 72*a* in step S15, the determination of step S16 is YES, and the process moves to step S17, where the abnormality detection apparatus 50 issues notification (an emergency alarm) of the occurrence of an abnormality to the system administrator. After that, the abnormality detection apparatus 50 executes a specified process. If it is not the short-term normal range 72*a* that the combination missed, the determination of step S16 is NO and the process moves to step S18.

In step S18, the abnormality detection apparatus 50 sets a time on which the short-term trend 71 and the like is to be generated (the trend analysis time), updates the end data as that time and date, and turns on the short-term trend obtaining flag. In step S19, the abnormality detection apparatus 50 determines whether or not there is significant fluctuation in the response time. If the network information 31 obtained in step S11 exceeds the response abnormality determination threshold illustrated in FIG. 10 for example, the determination of step S19 is YES and the process moves to step S20, where the abnormality detection apparatus 50 issues notification (an emergency alarm) of the occurrence of an abnormality to the system administrator. After that, the abnormality detection apparatus 50 executes a specified process. If the response time does not exceed the response abnormality determination threshold value, the determination is NO, and the process returns to step S11 described above.

The respective units 53-57 in FIG. 2 are realized by the execution of the above abnormality detection process. When the process returns to step S11 according to the determination of NO in step S15 or step S19, the abnormality detection apparatus 50 does not immediately executes step S11. Step S11 is performed after waiting the arrival of a specified timing. In this case, the abnormality detection process is executed at specified time intervals.

Meanwhile, while abnormality determination is performed with a threshold value for the response time (the response abnormality determination threshold) being the determination criterion when an abnormality is detected using the normal range 72 in this embodiment, other determination criteria may be adopted. A range of combinations of the number of input packets and the CPU load that are regarded as an abnormality that requires immediate notification may be adopted as the determination criterion. Hereinafter, variation examples for some cases in which such a determination criterion is adopted are explained with reference to FIG. 13-FIG. 15.

Figure 13:
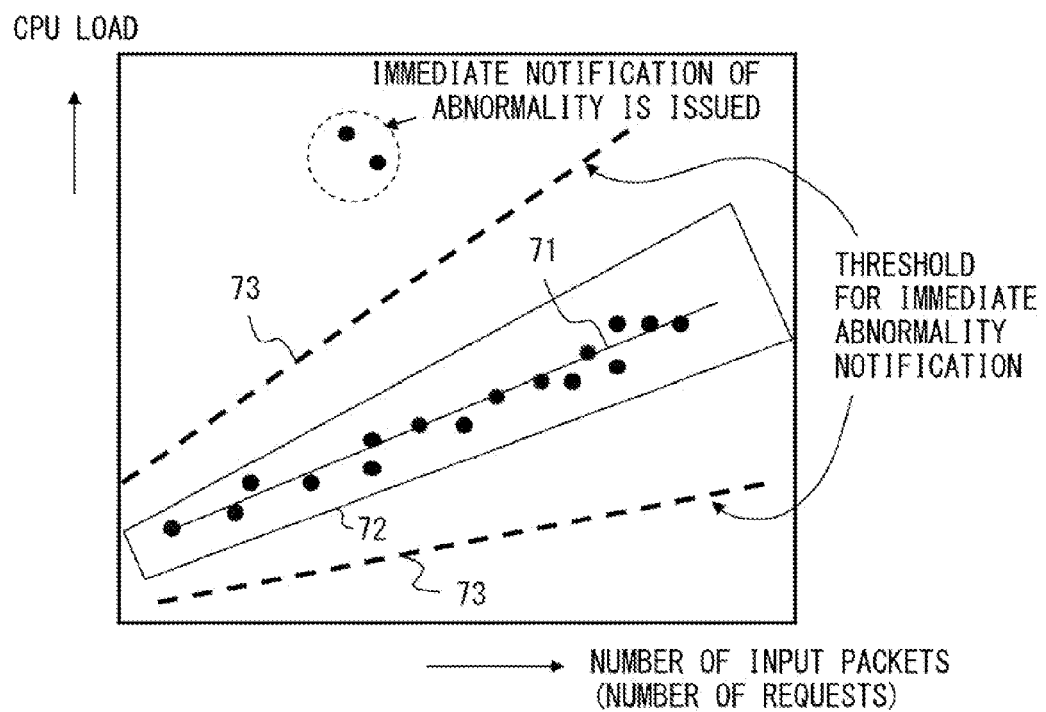
FIG. 13 is a diagram illustrating an example of setting a range of anomalies that are regarded as requiring immediate notification, according to combinations of the number of input packets and the CPU load.

FIG. 13 illustrates an example of setting range for combinations of the number of input packets and the CPU load that are regarded as an abnormality that requires immediate notification. In FIG. 13, the range that is regarded an abnormality that requires immediate notification is represented by a threshold for immediate abnormality notification 73. The threshold for immediate abnormality notification 73 is set above and below the trend 71 in order to detect both extreme increase and decrease in the CPU load with respect to the number of input packets as an abnormality.

When the threshold for immediate abnormality notification 73 as described above is adopted as the determination criterion, an extreme increase in the response time or an extreme decrease in the CPU load are also regarded as a serious abnormality, and immediate notification to the system administrator may be performed. Therefore, a similar effect as that for the embodiment described above is obtained.

FIG. 14 illustrates the trend/normal range data 51 in a case in which the threshold for immediate abnormality notification 73 as described above is set. As illustrated in FIG. 14, two thresholds for immediate abnormality notification 73 are managed as threshold for immediate abnormality notification upper limit data and threshold for immediate abnormality notification lower limit data. These data include gradient and Y-intercept.

Figure 15:
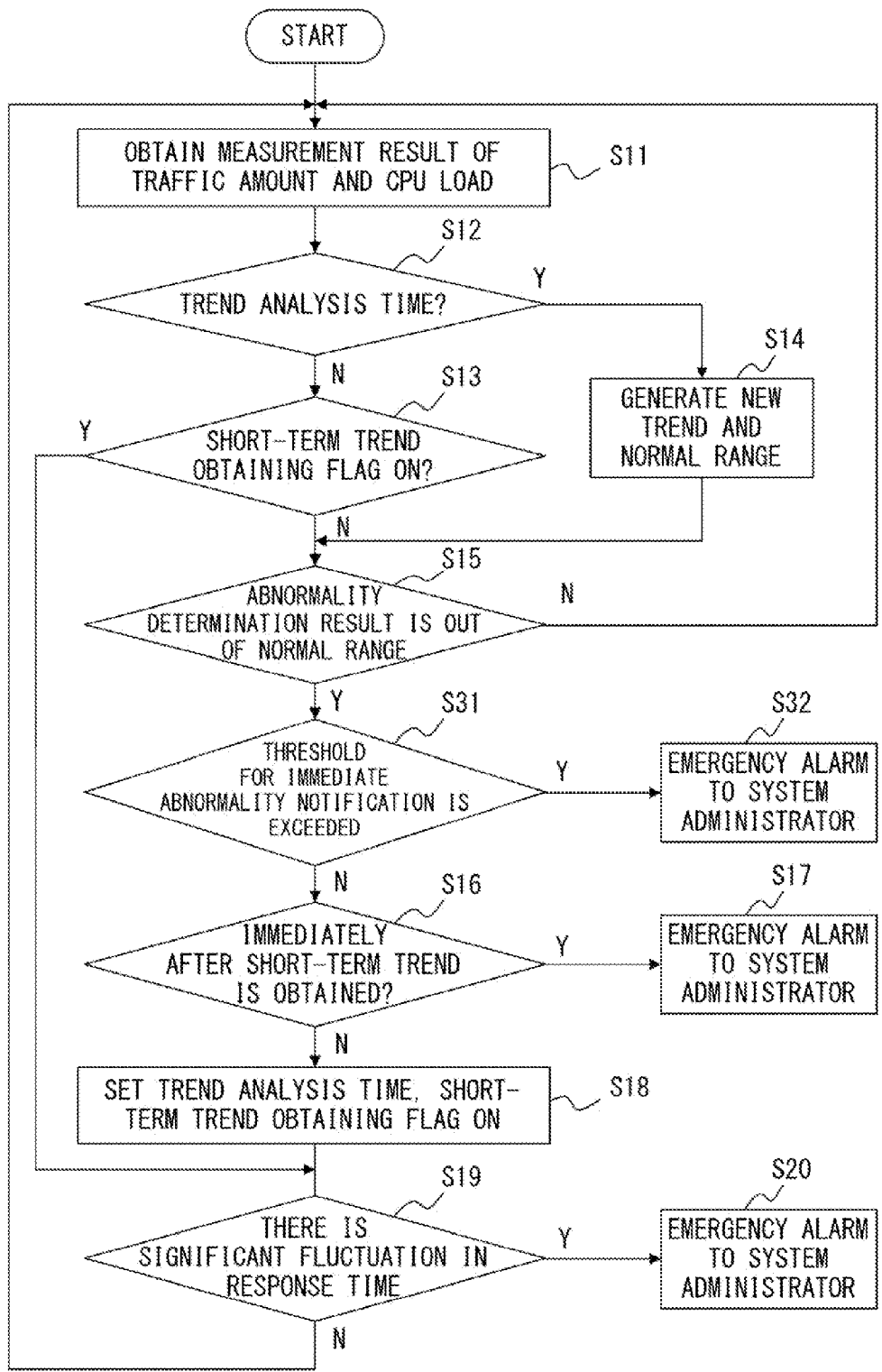
FIG. 15 is a flowchart of another abnormality detection process.

FIG. 15 is a flowchart of an abnormality detection process in a case in which the threshold for immediate abnormality notification 73 as described above is set. In FIG. 15, the same numbers are given to process steps with the same process contents as in FIG. 12. Therefore, hereinafter, the differences between FIG. 12 and FIG. 15 are explained.

In FIG. 15, when determination of step S15 is YES, step S31 is performed. That is, when a combination of the number of input packets and the CPU load that is determined as out of the normal range 72 in step S15, the abnormality detection apparatus 50 determines whether or not the combination exceeds either of the two thresholds for immediate abnormality notification 73. If any of the combination exceeds the threshold for immediate abnormality notification 73, the determination of step S31 is YES and the process moves to step S32, where the abnormality detection apparatus 50 issues notification (an emergency alarm) of the occurrence of an abnormality to the system administrator. If all of the combinations are within the range of the two thresholds for immediate abnormality notification 73, the determination of step S31 is NO, and the process moves to step S16. The explanation for step S16 and the following steps is omitted as they are substantially the same as those in FIG. 12.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A status decision apparatus comprising:
   an obtaining unit configured to obtain performance information about input traffic amount of a computer and a load of the computer and to store the performance information in a memory;
   a generating unit configured to periodically generate a normal range that represents a range of allowed load with respect to the input traffic amount based on the stored performance information;
   a decision unit configured to determine whether the load with respect to the input traffic amount is obtained within the normal range; and
   a control unit configured to cause the generating unit to update the normal range and to cause the decision unit to determine a status of the computer by using the updated normal range, when the load with respect to the input traffic amount is obtained out of the normal range.

2. The status decision apparatus according to claim 1, wherein
   the generating unit calculates a trend of the load with respect to the input traffic amount using the stored performance information, and generates the normal range based on the trend.

3. The status decision apparatus according to claim 1 further comprising
   an output unit configured to output information indicating a status of the computer, when the load with respect to the input traffic amount is obtained out of the updated normal range.

4. The status decision apparatus according to claim 1, further comprising:
   a response time obtaining unit configured to obtain response time of the computer; and
   an output unit configured to output information indicating a status of the computer, when the load with respect to the input traffic amount is obtained out of the normal range and the response time is longer than a specified threshold.

5. The status decision apparatus according to claim 4, wherein the control unit causes the generating unit to update the normal range and causes the decision unit to determine a status of the computer by using the updated normal range, when the load with respect to the input traffic amount is obtained out of the normal range and the response time is not longer than the specified threshold.

6. A computer-readable recording medium having stored therein a program for causing a processor to execute a status decision process, the process comprising:
   obtaining performance information about input traffic amount of a computer and a load of the computer and storing the performance information in a memory;
   periodically generating a normal range that represents a range of allowed load with respect to the input traffic amount based on the stored performance information;
   determining whether the load with respect to the input traffic amount is obtained within the normal range; and
   updating the normal range and determining a status of the computer by using the updated normal range, when the load with respect to the input traffic amount is obtained out of the normal range.

7. The computer-readable recording medium according to claim 6, wherein
   a trend of the load with respect to the input traffic amount is calculated using the stored performance information, and the normal range is generated based on the trend in the generating.

8. The computer-readable recording medium according to claim 6, the process further comprising
   outputting information indicating a status of the computer, when the load with respect to the input traffic amount is obtained out of the updated normal range.

9. The computer-readable recording medium according to claim 6, the process further comprising:
   obtaining response time of the computer; and
   outputting information indicating a status of the computer, when the load with respect to the input traffic amount is obtained out of the normal range and the response time is longer than a specified threshold.

10. The computer-readable recording medium according to claim 9, wherein
    the normal range is updated and a status of the computer is determined by using the updated normal range, when the load with respect to the input traffic amount is obtained out of the normal range and the response time is not longer than the specified threshold.

11. An status decision method performed by a processor comprising:
    obtaining performance information about input traffic amount of a computer and a load of the computer and storing the performance information in a memory;
    periodically generating a normal range that represents a range of allowed load with respect to the input traffic amount based on the stored performance information;
    determining whether the load with respect to the input traffic amount is obtained within the normal range; and
    updating the normal range and determining a status of the computer by using the updated normal range, when the load with respect to the input traffic amount is obtained out of the normal range.

12. A status decision apparatus comprising
    a processor to execute a status decision procedure, the procedure including:
    obtaining performance information about input traffic amount of a computer and a load of the computer and storing the performance information in a memory;
    periodically generating a normal range that represents a range of allowed load with respect to the input traffic amount based on the stored performance information;
    determining whether the load with respect to the input traffic amount is obtained within the normal range; and
    updating the normal range and determining a status of the computer by using the updated normal range, when the load with respect to the input traffic amount is obtained out of the normal range.

* * * * *